United States Patent
Handshaw et al.

(10) Patent No.: US 10,067,355 B1
(45) Date of Patent: Sep. 4, 2018

(54) IMAGING DEVICES HAVING AIMER SYSTEMS

(71) Applicant: SYMBOL TECHNOLOGIES, LLC, Lincolnshire, IL (US)

(72) Inventors: Darran Michael Handshaw, Sound Beach, NY (US); Edward Barkan, Miller Place, NY (US); Christopher P. Klicpera, Westbury, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/718,947

(22) Filed: Sep. 28, 2017

(51) Int. Cl.
*G06K 7/10* (2006.01)
*G02B 27/34* (2006.01)
*F21V 13/02* (2006.01)

(52) U.S. Cl.
CPC .............. *G02B 27/34* (2013.01); *F21V 13/02* (2013.01); *G06K 7/10772* (2013.01); *G06K 7/10831* (2013.01)

(58) Field of Classification Search
CPC .. G06K 7/10; G06K 7/10831; G06K 7/10772; G06K 7/10544; G06K 7/10722; G06K 7/10752

USPC .................................................... 235/462.21
See application file for complete search history.

(56) References Cited

U.S. PATENT DOCUMENTS

| 9,747,484 | B1* | 8/2017 | Drzymala | G06K 7/10752 |
| 2005/0284942 | A1* | 12/2005 | Gurevich | G06K 7/10544 235/462.21 |
| 2009/0084852 | A1* | 4/2009 | Vinogradov | G06K 7/10722 235/462.21 |
| 2017/0318206 | A1* | 11/2017 | Handshaw | G01C 3/00 |

* cited by examiner

*Primary Examiner* — Daniel Hess
(74) *Attorney, Agent, or Firm* — Yuri Astvatsaturov

(57) ABSTRACT

A method and apparatus for capturing an image of at least one object appearing in a field of view (FOV). A housing may be provided having an image sensor at least partially disposed therein. The imaging sensor has a central imaging axis. A first and a second aim line unit are each offset from the image sensor. The first aim line unit is oriented to project a first bounded light pattern that intersects the central imaging axis at an imaging plane. The second aim line unit is oriented to project a second bounded light pattern that intersects the first light pattern and the central imaging axis at the imaging plane.

23 Claims, 8 Drawing Sheets

IMAGING DEVICES HAVING AIMER SYSTEMS

BACKGROUND OF THE INVENTION

Barcode and other scanning devices generally capture images within a given field of view (FOV). In some instances, it is important to be aware of the central point of the field of view, particularly in cases where the barcode is positioned at relatively close or relatively far distances. For example, in environments where picklists are used, it may be necessary to read a single barcode in close proximity to other barcodes. In these environments, the scanning device must be precisely aimed to scan the desired barcode. Likewise, having a precisely aimed device may also be necessary when scanning barcodes that are far away.

When positioning the aiming source non-colinearly with the central imaging axis, the aiming pattern experiences a shift relative to the central imaging axis as a function of the distance between the sensor and the imaging plane. While some systems may address these and other issues via a combination of complicated electromechanical components coupled with software correction, such systems are fairly complex and costly, and can adversely impact reliability of the device. Further, these systems can require considerable processing time, which can add to the overall scanning time and therefore lower device usability.

Accordingly, there is a need for improved systems, methods, and devices which address these issues.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
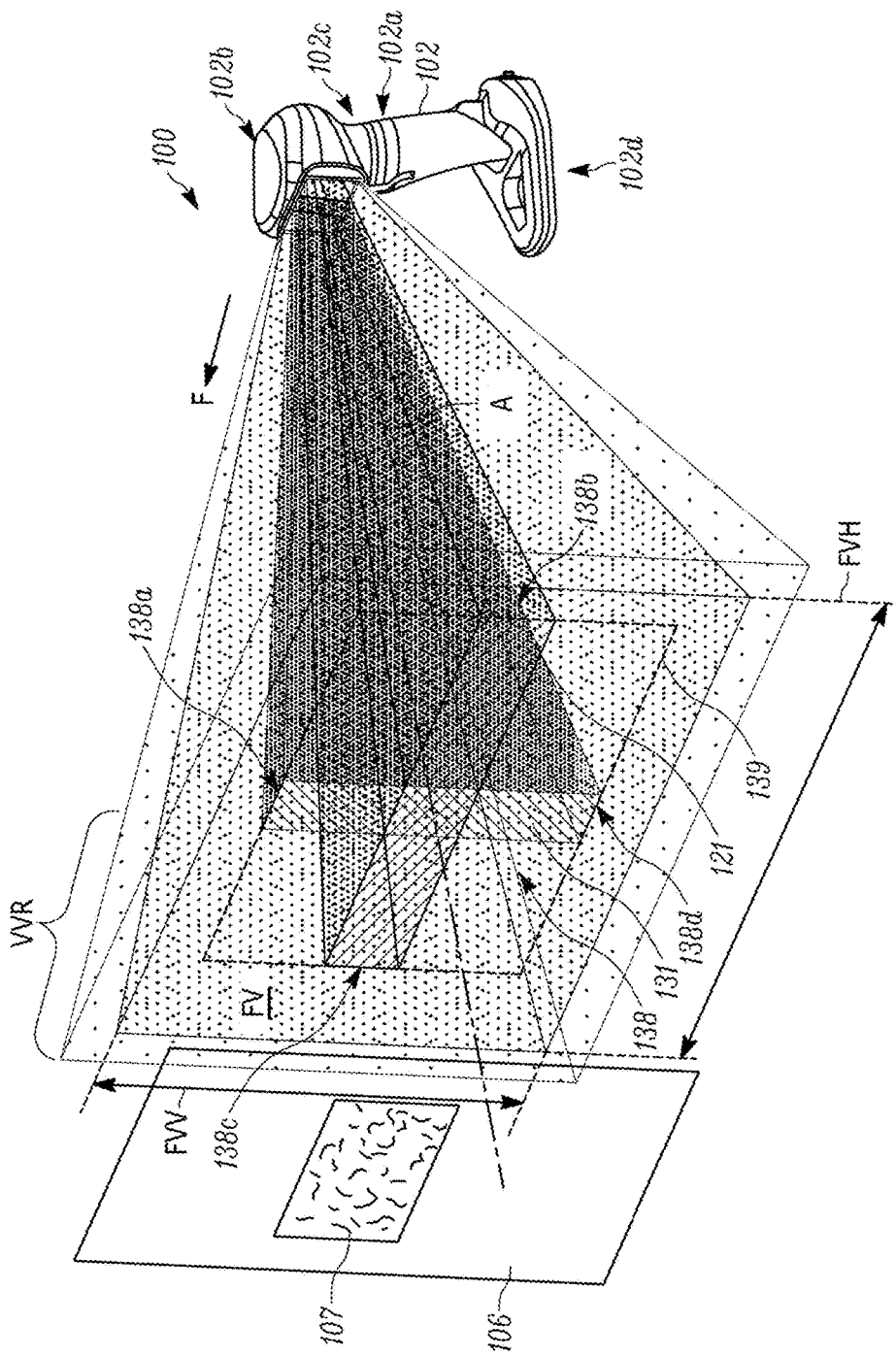
FIG. 1 is a perspective view of a scanning device having a field of view matched aimer in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary implementation, the present invention includes an imaging assembly for capturing an image of at least one object appearing in a field of view (FOV). A housing may be provided having an image sensor at least partially disposed therein. The imaging sensor has a central imaging axis. A first and a second aim line unit are each offset from the image sensor. The first aim line unit is oriented to project a first bounded light pattern that intersects the central imaging axis at an imaging plane. The second aim line unit is oriented to project a second bounded light pattern that intersects the first light pattern and the central imaging axis at the imaging plane.

In another exemplary implementation, the present invention includes a method of illuminating a target by an optical scanner that includes an image sensor that has a central imaging axis. A first and a second illumination unit are provided that are each offset from the image sensor. The first illumination unit is then illuminated to provide a first bounded light pattern that intersects the central imaging axis at an imaging plane. The second illumination unit is illuminated to provide a second bounded light pattern that intersects the first light pattern and the central imaging axis at the imaging plane.

In yet another exemplary implementation, the present invention includes an imaging assembly for capturing an image of at least one object appearing in a field of view. The imaging assembly includes a housing, an image sensor at least partially disposed within the housing, a first aiming unit offset from the image sensor, and a second aiming unit offset from the image sensor. The image sensor has a plurality of photosensitive elements forming a substantially flat surface at least partially within the housing. Further, the image sensor has a central imaging axis that is normal to the substantially flat surface. The first aiming unit includes an illumination source and a first aperture defined by a first line. The second aiming unit includes a second illumination source and a second aperture defined by a second line. The first line and the second line intersect at the central imaging axis.

A first embodiment of an imaging-based bar code reader is shown schematically in FIGS. 1-6. The scanning device 100 includes a housing 102, an imaging system 110 at least partially disposed within the housing 102 that includes an image sensor 112, an imaging lens 114, a printed circuit board 116, a first aim line unit 120, and a second aim line unit 130. The first aim line unit 120 and the second aim line unit 130 are each at least partially disposed within the housing 102 and offset from the image sensor 112. The printed circuit board 116 may include a memory and a controller that controls operation of the image sensor 112, the first aim line unit 120, the second aim line unit 130, and any additional components. The scanning device 100 may further include a chassis 140 and any number of additional components that may assist in operation of the scanning device 100 such as, for example, a window 142, coupling mechanisms 144, decoding systems, processors, circuitry coupled to the circuit board 116, and the like.

Figure 3:
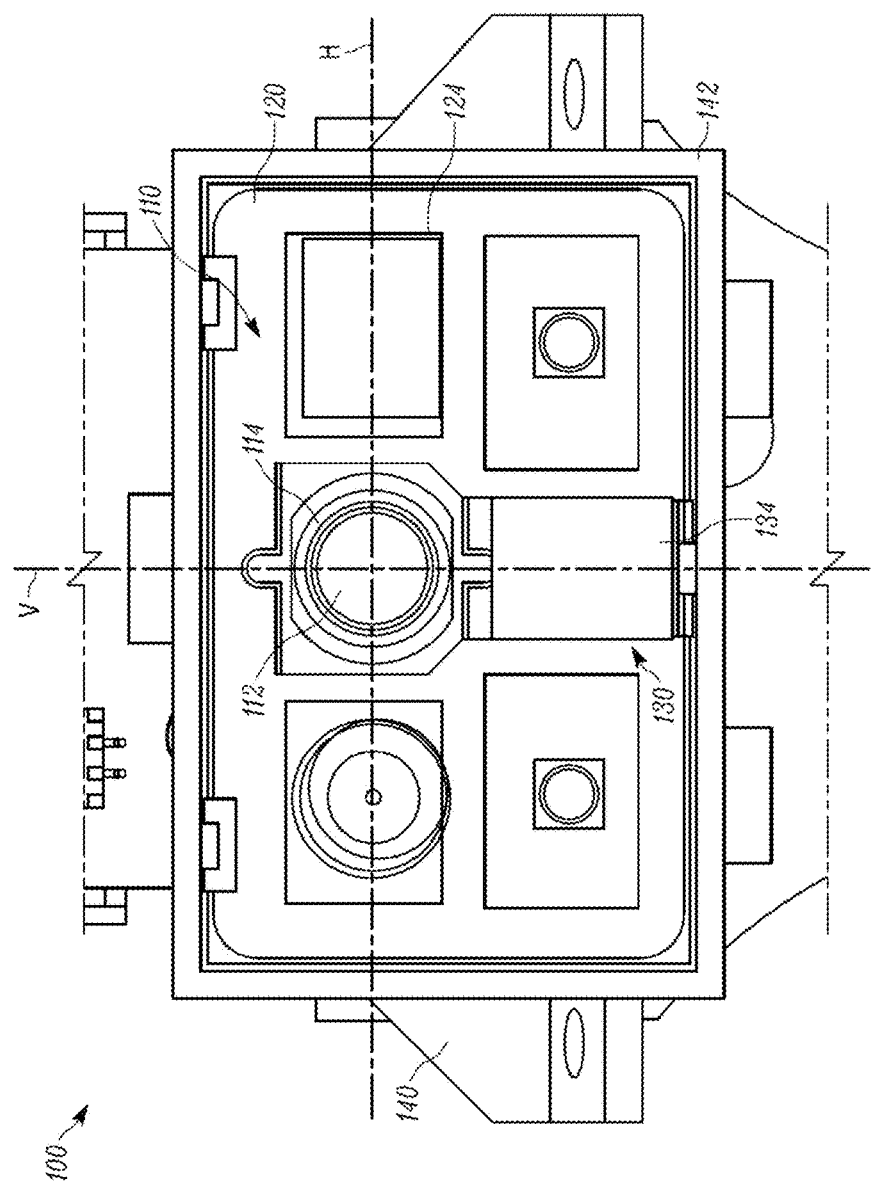
FIG. 3 is a front view of the device of FIGS. 1 and 2 illustrating an optical sensor and a plurality of aim line units in accordance with some embodiments.
Figure 4:
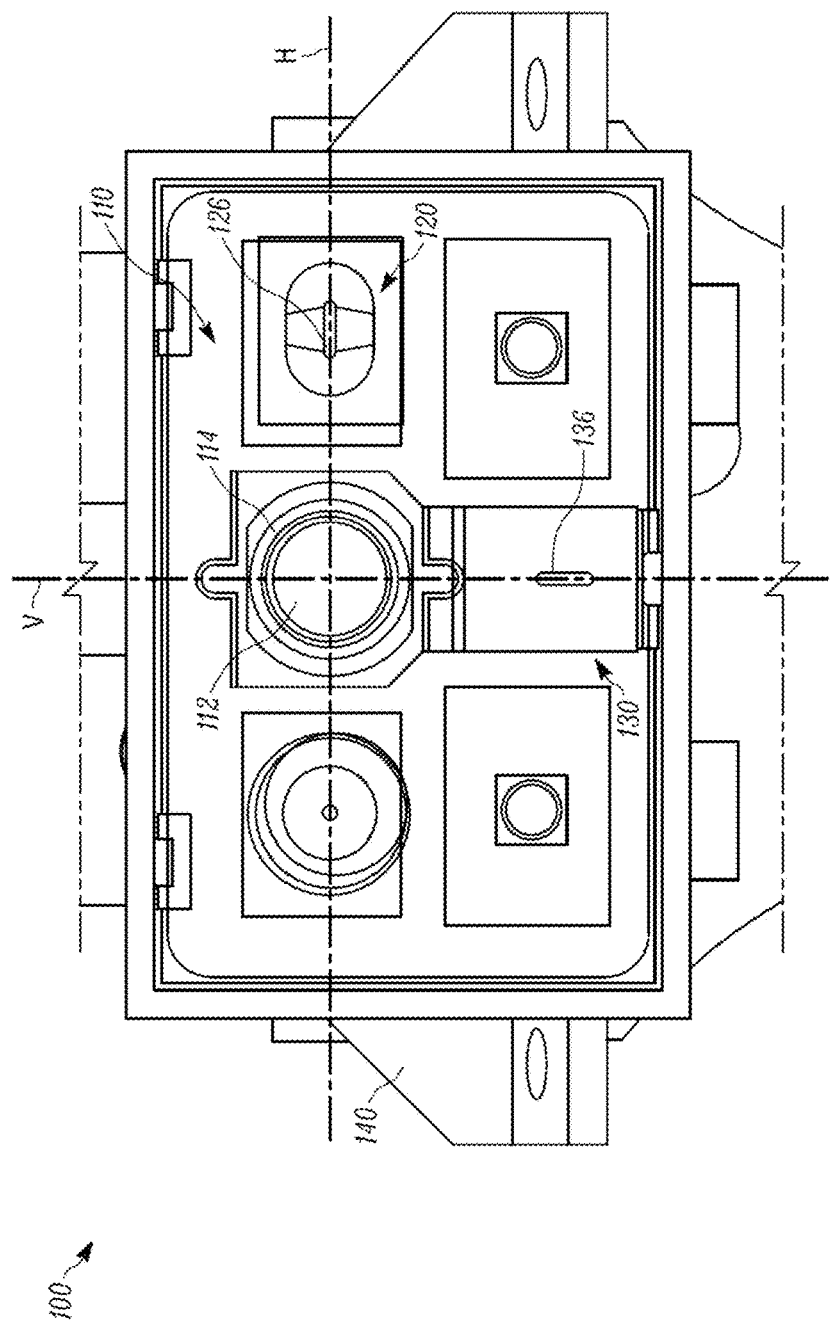
FIG. 4 is a front view of the device of FIGS. 1-3 illustrating additional components of the plurality of aim line units in accordance with some embodiments.

The housing 102 includes a gripping portion 102a and/or a trigger to be grasped by an operator's hand, and further includes a forward or scanning head portion 102b extending from an upper part 102c of the gripping portion 102a. In some examples, a lower portion 102d of the gripping portion 102a is adapted to be received in a docking station (not shown) positioned on a table and/or a sales counter. The scanning head portion 102b supports the imaging system 110 within an interior region of the housing 102. As illustrated in FIGS. 3 and 4, when viewed from a front view, the image sensor 112 defines a horizontal axis H that extends along a width of a field of view (FOV) of the image sensor 112 and a vertical axis V that extends along a height of the field of view of the image sensor 112. The horizontal axis H and the vertical axis V intersect at a central imaging axis A.

The imaging system 110 includes a modular scan engine or imaging camera assembly 111 and associated imaging circuitry (not shown) and includes the image sensor 112 and the imaging lens 114. The image sensor 112 may have a plurality of photosensitive elements forming a substantially flat surface at least partially within the housing. As previously stated, the image sensor 112 further has a defined central imaging axis A that is normal to the substantially flat surface. In some embodiments, the imaging axis A is coaxial with the central axis of the imaging lens 114. In some examples, the imaging lens 114 may be a variable focus imaging lens assembly. The imaging lens 114 may include a zoom lens assembly or system which includes a group or set of stationary lenses and a group or set of movable lenses. The camera assembly 111 may, but does not have to be, modular in that the housing 102 may be removed or inserted as a unit into the device 100, allowing the ready substitution of camera assemblies having different imaging characteristics, e.g., camera assemblies having different focal distances, working ranges, and fields of view (FOV). A working range WR is a distance range in front of or forward (in a direction F in FIG. 1) of the camera assembly 111 within which a target object of interest 106, such as a target bar code 107, may be successfully imaged and decoded.

Figure 2:
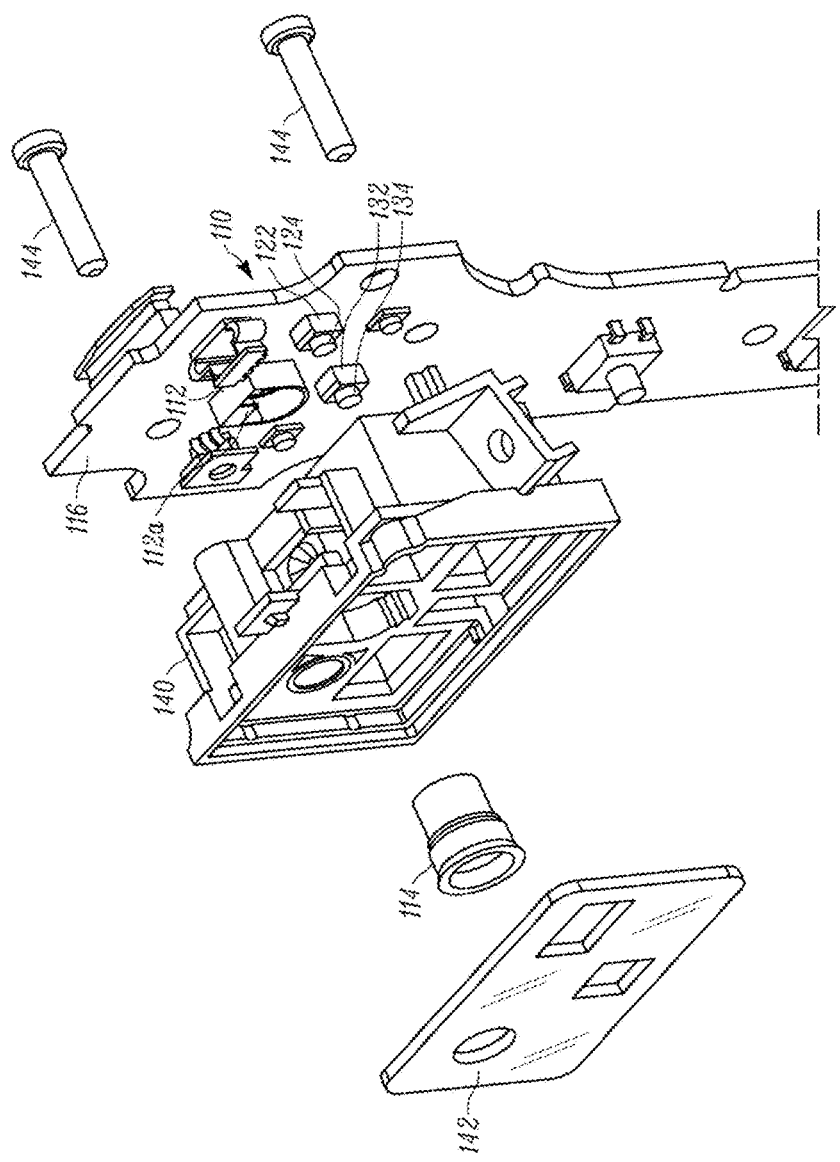
FIG. 2 is an exploded view of the scanning device of FIG. 1 in accordance with some embodiments.

The illumination-receiving pixels of the image sensor 112 define a light receiving sensor array surface 112a (best seen in FIG. 2). The image sensor 112 is secured to the printed circuit board 116 in a parallel direction for stability. The sensor array surface 112a is substantially perpendicular to the central imaging axis A of the imaging lens 114. In the illustrated example, and as best seen in FIG. 2, the housing 102 further accommodates a chassis 104 which is operably coupled to the housing 102. In these examples, the chassis 104 may support any number of components of the scanning device 100.

In operation, the image sensor 112 is enabled during an exposure period to capture an image of the target object 106, such as the target bar code 107, within the field of view FV of the imaging system 110. The field of view FV of the imaging system 110 is a function of both the configuration of the image sensor 112 and the imaging lens 114 in addition to a distance and orientation between the image sensor 112 and the imaging lens 114. In some exemplary embodiments, the imaging system 110 is a two dimensional (2D) imaging system and the image sensor 112 is a 2D sensor array. It should be understood, however, that the present disclosure may be equally applicable to a linear or one dimensional imaging system having a 1D linear sensor array.

The imaging system 110 field of view FV (shown schematically in FIG. 1) includes both a horizontal and a vertical component, the horizontal component being shown schematically as FVH and the vertical component being shown schematically as FVV. The image sensor 112 is primarily adapted to image 1D and 2D bar codes, for example, a Data Matrix bar code which, in the illustrated example, extends along a horizontal axis and includes multiple rows of indicia comprising a multi-row, multi-column array of dark bars and white spaces. In other examples, the bar code and/or target object 106 may be in any form such as an image postal code, a signature, and the like. Other examples are possible.

As previously noted, the imaging system 110 includes the first aim line unit 120 and the second aim line unit 130. The first and the second aim line units 120, 130 cooperate to illuminate the field of view FV, which will include the target bar code 107 during scanning. Specifically, the first aim line unit 120 is oriented to project a first bounded light pattern or line 121 that intersects the central imaging axis A at an imaging plane. Similarly, the second aim line unit 130 is oriented to project a second bounded light pattern or line 131 that intersects the central imaging axis A and the first bounded light pattern 121 at the imaging plane.

The first aim line unit 120 includes a first light source 122 which, in the illustrated example, is a light emitting diode (LED), but other light sources may be used. The first light source 122 may be coupled to the printed circuit board 116, and may be positioned along the horizontal axis H defined by the image sensor 112.

Figure 5:
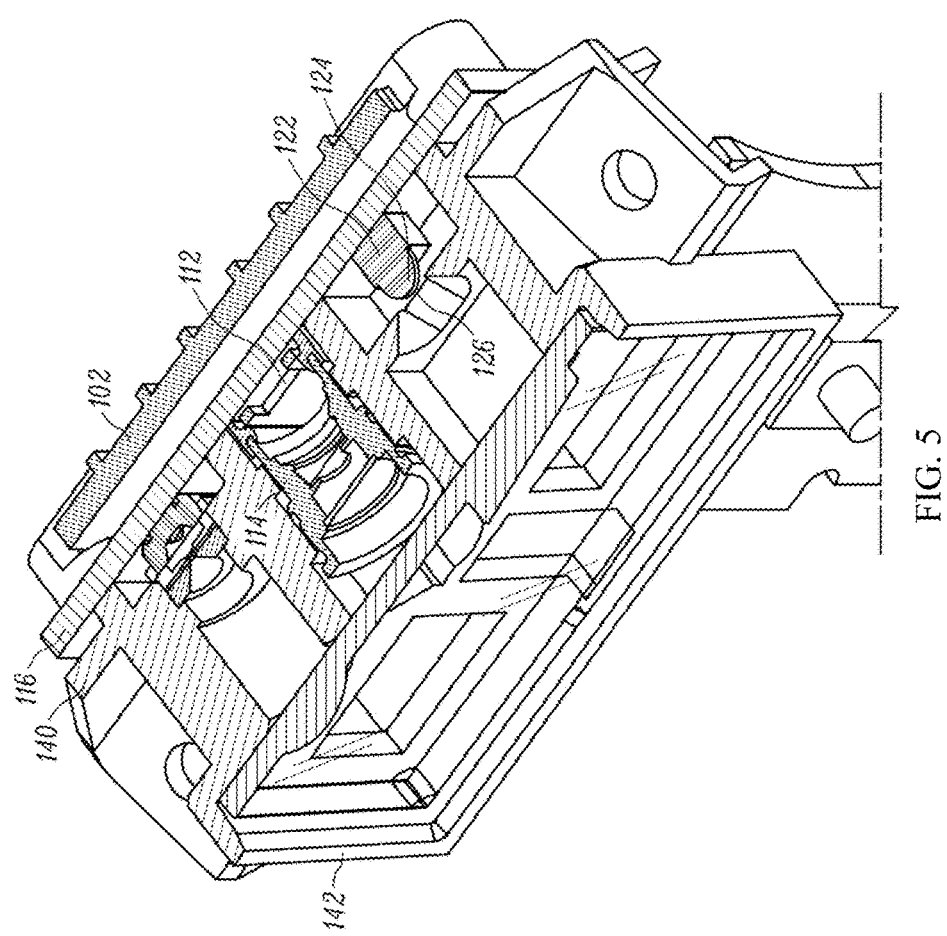
FIG. 5 is a cross sectional perspective view of the device of FIGS. 1-4 illustrating a first aim line unit in accordance with some embodiments.

The first aim line unit 120 further includes a first lens 124 positioned adjacent to or near (as illustrated in FIGS. 2-6) the first light source 122 and a first aperture 126 positioned adjacent to or near (as illustrated in FIG. 5) the first lens 124. In some examples, the first lens 124 may be positioned between approximately 6 mm and approximately 13 mm away from the first aperture 126. In some forms, the first lens 124 may be a distinct component positioned adjacent to the first light source 122, and in other examples, the first lens 124 may be an integral component of the window 142. In some examples, the first aperture 126 may be formed by a horizontal line opening or slit formed in the chassis 140. The first lens 124 and the first aperture 126 are oriented to receive light illuminating from the first light source 122 and form the first bounded light pattern 121. The first bounded light pattern 121 which may be in the form of a continuous or discontinuous line.

Similarly, the second aim line unit 130 includes a second light source 132 which, in the illustrated example, is a light emitting diode (LED). Other light sources may be used. The second light source 132 may be coupled to the printed circuit board 116, and may be positioned along the vertical axis V defined by the image sensor 112. In other words, the second aim line unit 130 may be positioned vertically coplanar to the image sensor 112.

Figure 6:
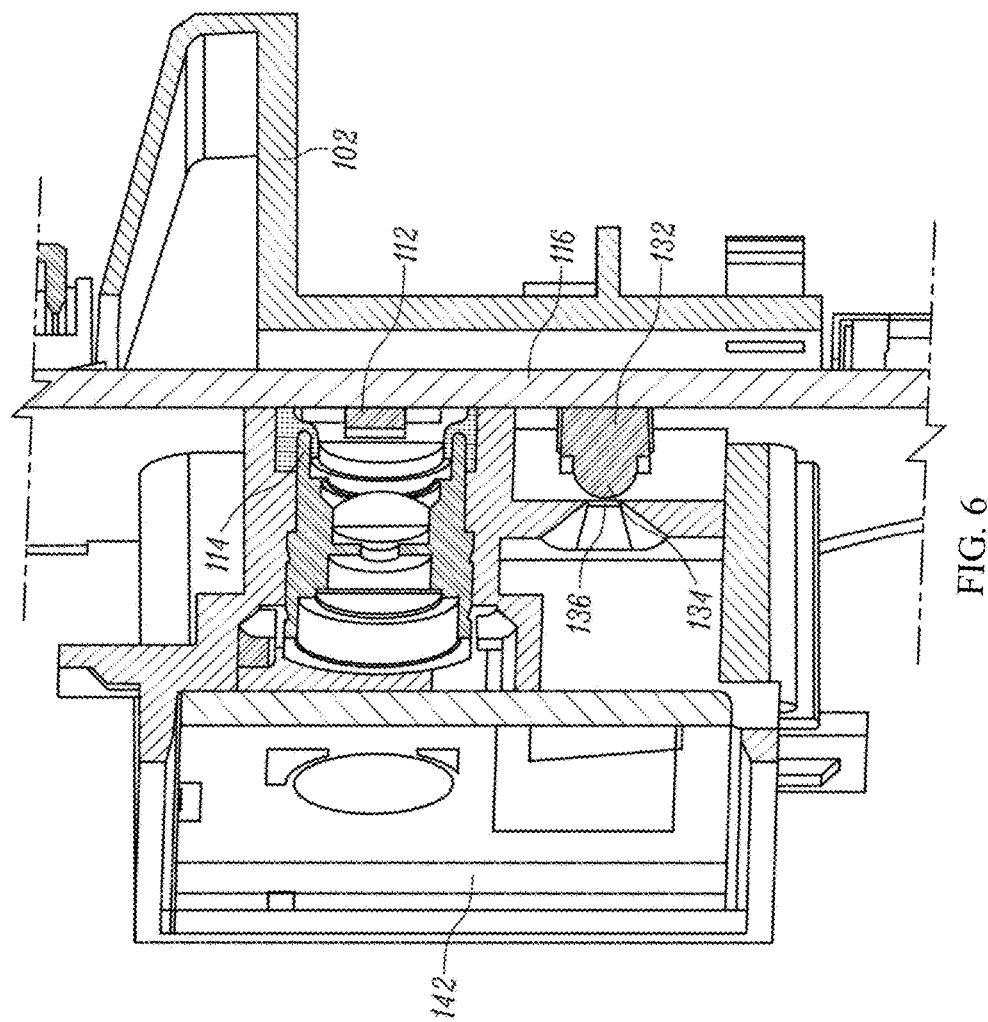
FIG. 6 is a cross sectional perspective view of the device of FIGS. 1-5 illustrating a second aim line unit in accordance with some embodiments.

The second aim line unit 130 further includes a second lens 134 positioned adjacent to or near (as illustrated in FIGS. 2-6) the second light source 132 and a second aperture 136 positioned adjacent to or near (as illustrated in FIG. 6) the second lens 134. In some examples, the second lens 134 may be positioned between approximately 6 mm and approximately 13 mm away from the second aperture 136. In some forms, the second lens 134 may be a distinct component positioned adjacent to the second light source 132, and in other examples, the second lens 134 may be an integral component of the window 142. Further, in some examples, the second aperture 136 may be formed by a vertical line opening or slit formed in the chassis 140. The second lens 134 and the second aperture 136 are oriented to receive light illuminating from the second light source 132 and form the second bounded light pattern 131 which may be in the form of a continuous or discontinuous line.

In some examples, the first aperture 126 may have dimensions of approximately 0.3 mm×2.3 mm. The second aperture 136 may have dimensions of approximately 1.33 mm×0.3 mm. Other dimensions may be used depending on the desired field of view of the device 100.

The field of view FV is defined by the particular imaging system 110 and may vary among scanning devices 100. Nonetheless, each imaging system 110 has a nominal field of view which is depicted as FV in FIG. 1. During an initial setup and/or configuration phase, the first aim line unit 120 and the second aim line unit 130 are positioned such that the first bounded light pattern 121 approximately aligns with and/or corresponds to the width of the horizontal component FVH and the second bounded light pattern 131 approximately aligns with and/or corresponds to the height of the vertical component FVV at a specified imaging plane.

Because the first bounded light pattern 121 and the second bounded light pattern 131 intersect the central imaging axis A at the same imaging plane, the patterns 121, 131 combine to form a cross pattern 138 that defines a number of outer edges 138a, 138b, 138c, 138d of the imaging plane. As illustrated in FIG. 1, the aimer units may be adjusted/configured such that the outer edges 138a, 138b, 138c, 138d fall within the field of view of the imaging sensor 112. In some examples, the cross pattern 138, and thus the allowable field of view dimension 139, may be slightly smaller than the field of view FV to ensure the object 106 is properly contained within the field of view FV.

Figure 7A:
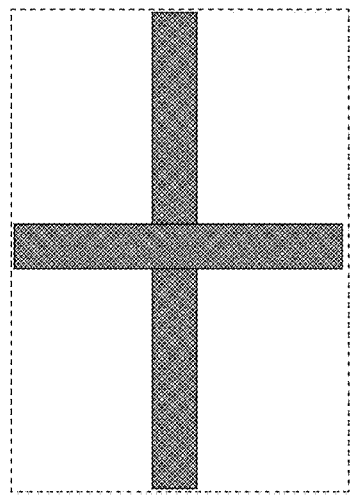
FIGS. 7A-7C illustrate an exemplary cross pattern produced by an aimer of the present disclosure.
Figure 7B:
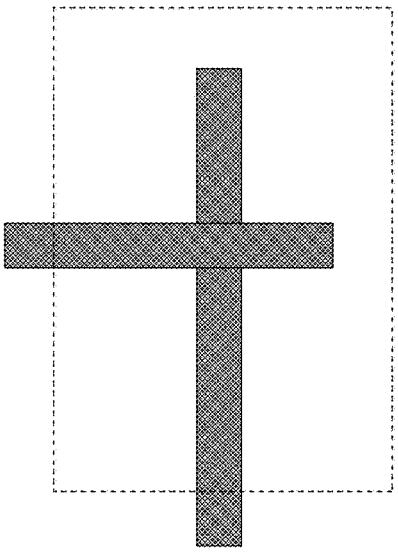
Figure 7C:
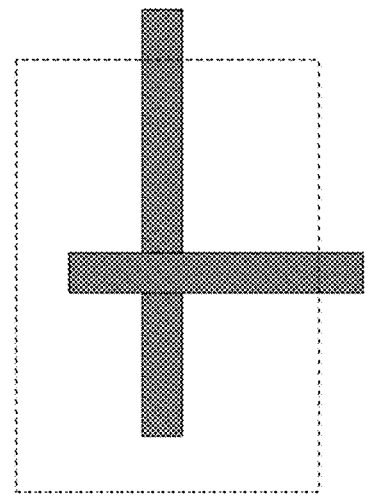
Figure 8B:
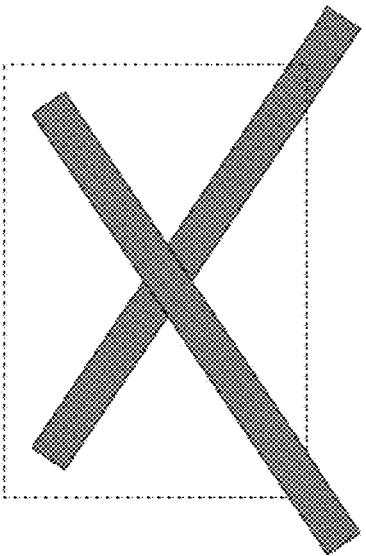
FIGS. 8A-8C illustrate an exemplary cross pattern produced by an aimer of the present disclosure.
Figure 8C:
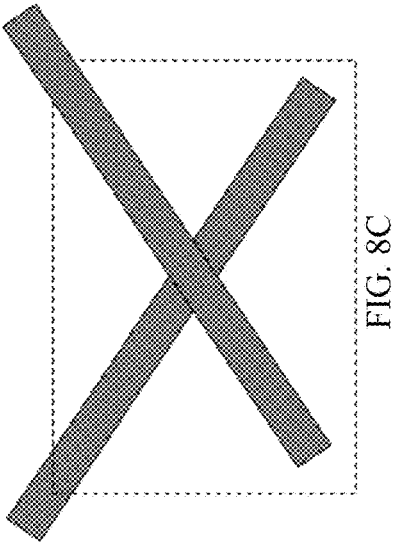
Figure 8A:
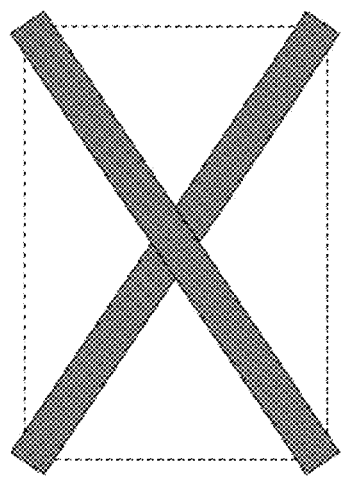

In the illustrated example, the first bounded light pattern 121 and the second bounded light pattern 131 cooperate to form a perpendicular cross pattern 138 whereby the first bounded light pattern 121 and the second bounded light pattern 131 form a right angle. This can be seen more clearly in FIGS. 7A-7C which illustrate the cross pattern's appearance on an imaging plane. In particular, FIG. 7A illustrates the appearance of the pattern when the reader is positioned at a nominal range; FIG. 7B illustrates the appearance of the pattern when the reader is positioned at a far range; and FIG. 7C illustrates the appearance of the pattern when the reader is positioned at a near range. In other examples, the first bounded light pattern 121 and the second bounded light pattern 131 may cooperate to form a non-perpendicular cross pattern (not shown) and intersect (at an imaging plane) at an oblique angle. An example of an aim pattern produced by such a configuration is illustrated in FIGS. 8A-8C. In these implementations, at least one of the first aim line unit 120 or the second aim line unit 130 may have to be offset from one of the horizontal or vertical axes H, V. It should be noted that the thickness of the lines produced by the optical patterns illustrated in FIGS. 1 and 7A-8C are merely exemplary. This thickness can be adjusted as desired, allowing for the size adjustment of the point of crossover.

In yet other examples, the first aim line unit 120 may be offset from the image sensor 112 at a first elevation or height relative to the central imaging axis A. This first elevation or height may be zero or level with and to a side of the central imaging axis A (as illustrated in the figures) or alternatively may be at a non-zero elevation value. The second aim line unit 130 may be offset from the image sensor 112 at a second elevation or height relative to the central imaging axis that is different than the first elevation or height and may be positioned below or above the central imaging axis A.

So configured, the first bounded light pattern 121 and the second bounded light pattern 131 may cooperate to define the minimum field of view FV of the scanning device 100. As such, by positioning a target object of interest 106 so that it falls within the cross pattern 138, the target object of interest 106 can be properly captured by the imaging system 110.

Additionally, because of the relative positioning of the first aim line unit 120, the second aim line unit 130, and the image sensor 112, the first bounded light pattern 121 and the second bounded light pattern 131 intersect the central imaging axis A at the same point, which effectively eliminates parallax that occurs between the first aim line unit 120 and the second aim line unit 130. This intersection point serves as an indicator of the FOV center, and can assist with accurately aiming the device 100. In environments where the distance between the imaging plane and the imager is varied, the first bounded light pattern 121 and the second bounded light pattern 131 still intersect the central imaging axis A at the same point and thus still provides an accurate indicator of the center of the imaging plane, which in turn reduces or eliminates the likelihood of scanning an incorrect target object of interest 106.

The systems and approaches described herein may only require an initial calibration to properly identify the relative positioning of the image sensor 112, the first aim line unit 120, and the second aim line unit 130. Accordingly, it is not necessary to repeat the processing steps at every trigger pull, as upon the initial calibration, the system is configured to consistently illuminate the point corresponding to the center of the imager and/or the center of the field of view, which may be used in any and all subsequent scanning. While the duration of a scan varies depending on lighting conditions (which drives sensor exposure times) and image quality, the device 100 may be capable of completing scans in less than approximately 60 ms, and may therefore improve scan times. This configuration may be advantageous in that it avoids the use of electromechanical and/or software components to align the mark, therefore this time is not added to the overall image capture time.

In some approaches, a method of illuminating a target by an optical scanner that includes an image sensor having a central imaging axis includes providing the first and the second illumination units, both of which are offset from the image sensor. The first illumination unit is illuminated to provide a first bounded light pattern that intersects the central imaging axis at an imaging plane. Similarly, the second illumination unit is illuminated to provide a second bounded light pattern that intersects the first light pattern and the central imaging axis at the imaging plane.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An imaging assembly for capturing an image of at least one object appearing in a field of view (FOV), the imaging assembly comprising: a housing; an image sensor at least partially disposed within the housing, the imaging sensor having a central imaging axis; a first aim line unit offset from the image sensor; a second aim line unit offset from the image sensor; wherein: the first aim line unit being oriented to project a first bounded light pattern that intersects the central imaging axis at an imaging plane; and the second aim line unit being oriented to project a second bounded light pattern that intersects the first bounded light pattern and the central imaging axis at the imaging plane.

2. The imaging assembly of claim 1, wherein the first bounded light pattern and the second bounded light pattern combine to form a cross pattern defining a plurality of outer edges of the imaging plane, wherein the plurality of outer edges corresponds to an allowable FOV dimension of light received from a FOV that impinges onto the imaging sensor.

3. The imaging assembly of claim 2, wherein the first light pattern and the second light pattern form a perpendicular cross pattern.

4. The imaging assembly of claim 2, wherein first light pattern and the second light pattern form a non-perpendicular cross pattern.

5. The imaging assembly of claim 1, wherein the first aim line unit includes a first light source, a first lens, and a first aperture, the first lens and the first aperture being oriented to receive light illuminating from the first light source, wherein the second aim line unit includes a second light source, a second lens, and a second aperture, the second lens and the second aperture being oriented to receive light illuminating from the second light source.

6. The imaging assembly of claim 5, wherein the first aperture is defined by a first opening in a chassis, wherein the second aperture is defined by a second opening in the chassis.

7. The imaging assembly of claim 5, wherein the first lens and the second lens are at least partially formed by a window coupled to the chassis.

8. The imaging assembly of claim 5, wherein the first aperture comprises a horizontal line aperture that forms a bounded horizontal line of light.

9. The imaging assembly of claim 5, wherein the second aperture comprises a vertical line aperture that forms a bounded vertical line of light.

10. The imaging assembly of claim 5, wherein the first aperture is approximately 0.3 mm by approximately 2.3 mm, wherein the second aperture is approximately 1.33 mm×0.3 mm.

11. The imaging assembly of claim 1, wherein the first aim line unit is positioned horizontally coplanar to the image sensor and the second aim line unit is positioned vertically coplanar to the image sensor.

12. The imaging assembly of claim 1, wherein the first aim line unit is positioned along a first diagonal plane relative to the image sensor, and wherein the second aim line unit is positioned along a second diagonal plane relative to the image sensor, wherein the second diagonal plane is symmetrical to the first diagonal plane.

13. The imaging assembly of claim 1, wherein the first aim line unit is offset from the image sensor at a first elevation relative to the central imaging axis of the image sensor, and wherein the second aim line unit is offset from the image sensor at a second elevation relative to the central imaging axis of the image sensor.

14. The imaging assembly of claim 1, wherein the first aim line unit is positioned level with and to a side of the central imaging axis, and wherein the second aim line unit is positioned below or above the central imaging axis.

15. The imaging assembly of claim 1, wherein the first bounded light pattern is one of a continuous line or a discontinuous line and wherein the second bounded light pattern is one of a continuous line or a discontinuous line.

16. The imaging assembly of claim 1, wherein the first bounded light pattern is adapted to align with a horizontal component of the FOV at the imaging plane, wherein the second bounded light pattern is adapted to align with a vertical component of the FOV at the imaging plane.

17. A method of illuminating a target by an optical scanner including an image sensor having a central imaging axis, the method comprising: providing a first illumination unit being offset from the image sensor; providing a second illumination unit being offset from the image sensor; illuminating the first illumination unit to provide a first bounded light pattern that intersects the central imaging axis at an imaging plane; and illuminating the second illumination unit to provide a second bounded light pattern that intersects the first light pattern and the central imaging axis at the imaging plane.

18. The method of claim 17, wherein the first bounded light pattern and the second bounded light pattern combine to form a cross pattern defining a plurality of outer edges of the imaging plane.

19. The method of claim 18, wherein the first light pattern and the second light pattern combine to form a perpendicular cross pattern.

20. The method of claim 19, wherein first light pattern and the second light pattern combine to form a non-perpendicular cross pattern.

21. An imaging assembly for capturing an image of at least one object appearing in a field of view (FOV), the imaging assembly comprising: a housing; an image sensor at least partially disposed within the housing, the image sensor having a plurality of photosensitive elements forming a substantially flat surface at least partially within the housing, the image sensor further having a central imaging axis that is normal to the substantially flat surface; a first aiming unit offset from the image sensor; a second aiming unit offset from the image sensor; wherein the first aiming unit includes an illumination source and a first aperture defined by a first line, and the second aiming unit includes a second illumination source and a second aperture defined by a second line, the first line and the second line intersecting at the central imaging axis.

22. The imaging assembly of claim 21, wherein the first line and the second line intersect to form a right angle.

23. The imaging assembly of claim 22, wherein the first line and the second line intersect to form a non-right angle.

* * * * *